Figure 1:
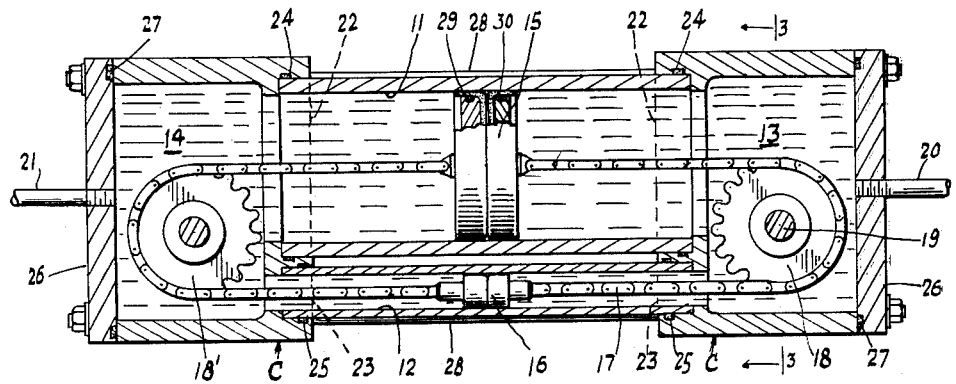

Feb. 18, 1964     C. H. GRAHAM     3,121,371

POWER TRANSLATOR

Filed May 18, 1961

INVENTOR
CHARLES H. GRAHAM.

BY *Robert L. Gunn*
ATTORNEY

Patent 3,121,371 — Power Translator

3,121,371
POWER TRANSLATOR
Charles H. Graham, Palo Alto, Calif., assignor to Graham Engineering Company, Inc., Palo Alto, Calif., a corporation of California
Filed May 18, 1961, Ser. No. 111,017
4 Claims. (Cl. 92—68)

This invention relates to power equipment and deals with a device for converting power impulses into hydraulic pressure, and vice versa, and also for translating a replica of the power to a remote piece of equipment to repeat the same as represented by movement of the hydraulic medium.

The invention to be shown and described hereinafter has been reduced to its simplest form and has been illustrated as a single piece of equipment without any relation to other equipment with which it is ordinarily associated. The application of the device to correlated practical uses will be obvious to those understanding the art.

The primary object of this invention, is to provide a piece of equipment for the purpose described which can be produced in various sizes from miniature to massive to handle unlimited types of work, such as occur in automation machinery and the like.

Another important object is the provision of a master machine that will follow closely the movement of a prime mover and will faithfully translate the same to its slaves, regardless of the size or distances of the piece of equipment involved in the system. In practice, it is contemplated to produce systems using power that will operate huge loading equipment capable of handling several tons, as well as small equipment where the prime consideration is the accuracy and the timing of the movement.

Another object is to provide a power translator comprising two interconnected cylinders, namely, a comparatively large cylinder and a comparatively small cylinder wherein the large cylinder has a double sided piston working therein, and the small cylinder has a double sided piston, together with a chain driven by a sprocket gear connected to the two pistons. The two cylinders are substantially parallel and are interconnected at adjacent ends. The whole device is made leak proof and is filled with a fluid, preferably a light oil. Means is provided for driving one of the sprockets to move the pistons in opposite directions in the cylinders in conformance with power delivered by a prime mover, thereby setting up a fluid pressure in one of the chambers depending on the direction in which the pistons are moved. Standard conduit outlets are provided in each chamber for connecting the fluid therein to remotely situated pieces of equipment to operate the same in response to movement of the large piston as represented by the movement of the hydraulic medium.

Figure 2:
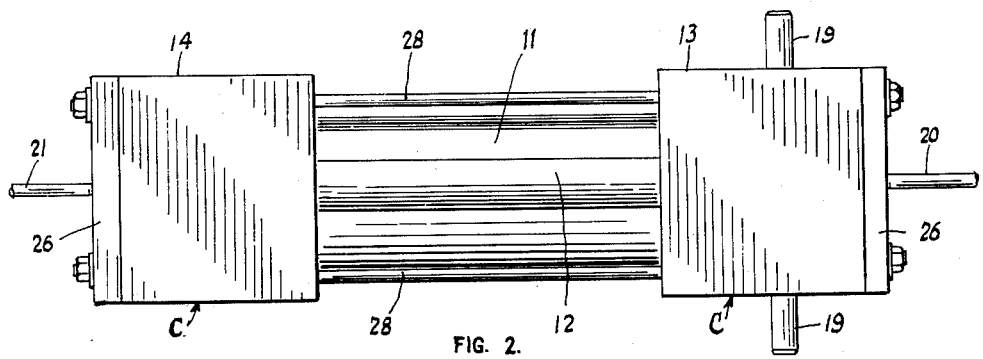
Figure 3:
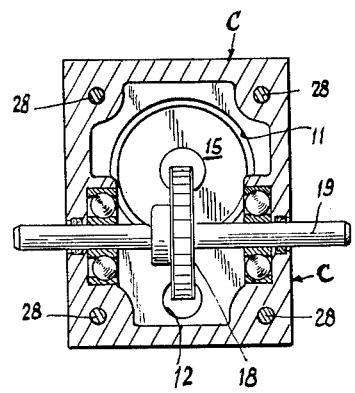
Figure 4:
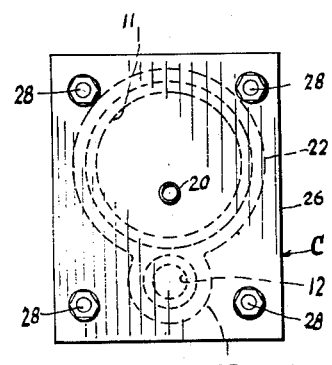

Other objects and advantages such as the small number of parts required, the versatility of the device, the evident durability, and the lack of attendant mechanism will become obvious as the description proceeds in conjunction with the drawing in which:

FIG. 1 is a longitudinal section of my device;
FIG. 2 is a bottom plan view of the same;
FIG. 3 is a cross section taken on line 3—3 of FIG. 1; and
FIG. 4 is an end view of my device.

Referring to the drawing and particularly to FIG. 1, it will be seen that my device consists essentially of a large cylinder 11 and a comparatively small cylinder 12 which are interconnected at adjacent ends by chambers 13 and 14. In the cylinder 11, which is the power cylinder, I mount a double sided piston 15 and in the cylinder 12 which is the sealing cylinder, I mount another double sided piston 16. The purpose of the two sided pistons is to allow them to work in either direction to displace the fluid which completely fills the inner space in the device. To achieve the best results, I recommend a light oil for filling the case.

The pistons 15 and 16 are connected in a chain 17 which passes over sprockets 18 and 18' suitably mounted in the chambers 13 and 14 respectively. Either one or both of the sprockets may be driven. In this case, I have shown the sprocket 18 as being mounted on a shaft 19 which extends externally of the case on both sides for a power connection to a prime mover. The chambers 13 and 14 are each provided with an outlet designated 20 and 21 respectively which may extend to any remote piece of equipment in a conventional manner.

In making and assembling the device, I prefer to use the exact desired length of each cylinder and fit the open ends into a collar, generally designated C. As shown, this collar is formed with straight walls at right angles to each other to provide a box shape with better mounting for the shafts which support the sprockets, also reducing the cost of manufacture. One side of the box is formed with circular flanges 22 and 23, see FIG. 4, for receiving the open ends of the cylinders 11 and 12 respectively, and are provided with packing 24 and 25 respectively to prevent leakage. Another side of the box is formed by a removable plate 26 which is also sealed by a packing 27. The whole assembly is held together by a draw bolt 28 in each corner of the plate 26.

The pistons 15 and 16 may take a variety of forms, the only requirement being that they are adapted to displace fluid from either side and are of sufficient width to slide freely in the cylinders without cocking or locking. I have shown a two piece cup leather on the piston consisting of two cups 29 and 30 mounted back to back on a split piston with suitable means for attaching the chain 17 to the pistons. In connecting the pistons in the chain 17, bearing in mind that they travel in opposite directions, they both should be originally set at equal distances from the two sprockets 18 and 18'.

In operation, the prime mover, not a part of this invention, is connected to the shaft 19 and any movement imparted to the shaft will move the piston 15 in the direction and to the extent of the movement of the prime mover. It is obvious that any movement imparted to the piston 15 will also be imparted to the piston 16 but in an equal and opposite direction, therefore, the two pistons and cylinders being of unequal diameter, there will be an unequal displacement by the two pistons which will result in a differential of oil being accumulated in one of the chambers depending on which directions the pistons move. This will create a pressure in that particular chamber that will force the oil out into the conduit leading to a remote piece of equipment, which may be a duplicate of the present device but in reverse, that will repeat the movement of the prime mover, or it may be a simple piece of equipment that will be operated in timed relation to other correlated equipment. It is to be understood that the whole system is a closed circuit and that the oil forced through the conduits 20 and 21 is returned to the translator through the same conduits, thereby setting up an intermittent oscillatory system.

The foregoing description has been directed to the use of an incompressible fluid, however, it should be understood the invention also embraces the use of a compressible fluid which may be used in some cases with no modification of the device in any respect.

I claim:
1. A rotary actuator comprising:
 (a) a power cylinder;
 (b) a power piston fluid-tightly movable in said power cylinder;

(c) a sealing cylinder of substantially smaller internal diameter than said power cylinder;
(d) a sealing piston fluid-tightly movable in said sealing cylinder;
(e) a pair of chambers, each chamber including a cylinder coupling plate having a first cylindrical bore dimensioned for slidingly receiving one external end portion of said power cylinder and an outwardly facing shoulder in said first bore for engaging the end face of the received power cylinder end portion and having a second cylindrical bore dimensioned for slidingly receiving one external end portion of said sealing cylinder and an outwardly facing shoulder in said second bore for engaging the end face of the received sealing cylinder end portion;
(f) clamping means arranged for tightly clamping said chambers across opposite end portions of said cylinders;
(g) resilient seal means interposed between the inner and outer peripheral surfaces of said bores and cylinder end portions to establish a fluid-tight seal therebetween;
(h) a sprocket rotatably mounted in each chamber;
(i) chain means mounted on each of said sprockets and respectively interconnecting adjacent ends of said pistons; and
(j) a fluid pressure system coupled to at least one of said chambers to pressurize said chamber to thereby actuate said power piston to move in a downstream direction.

2. A rotary actuator comprising:
(a) a tubular power cylinder;
(b) a power piston fluid-tightly movable in said power cylinder;
(c) a tubular sealing cylinder of substantially smaller internal diameter than and of substantially the same axial length as said power cylinder;
(d) a sealing piston fluid-tightly movable in said sealing cylinder;
(e) a pair of chambers, each chamber including a cylinder coupling plate having a first cylindrical bore dimensioned for slidingly receiving one external end portion of said power cylinder and an outwardly facing shoulder in said first bore for engaging the end face of the received power cylinder end portion and having a second cylindrical bore dimensioned for slidingly receiving one external end portion of said sealing cylinder and an outwardly facing shoulder in said second bore for engaging the end face of the received sealing cylinder end portion, said first and second bore in each coupling plate being arranged that said power and sealing cylinders extend substantially parallel between opposite chambers;
(f) clamping means arranged for tightly clamping said chambers across opposite end portions of said cylinders;
(g) resilient seal means interposed between the inner and outer peripheral surfaces of said bores and cylinder end portions to establish a fluid-tight seal therebetween;
(h) sprocket means rotatably mounted in each chamber;
(i) chain means mounted on each of said sprockets and respectively interconnecting adjacent ends of said pistons; and
(j) a fluid pressure system coupled to at least one of said chambers to pressurize said chamber to thereby actuate said power piston to move in a downstream direction.

3. A rotary actuator in accordance with claim 2 in which each chamber is sealed with a detachable closure plate substantially parallel to said cylinder coupling plate and in which said clamping means comprises a plurality of threaded bolts engaging said closure plates and arranged to clamp one closure plate against the other across said chambers and cylinders to thereby fluid tightly seal each closure plate to its associated chamber and securely hold each chamber to the associated cylinder end portions.

4. A rotary actuator in accordance with claim 3 in which each chamber further includes a pair of parallel side walls having axially aligned friction-less bearing means and in which each sprocket means include a sprocket shaft engaging said bearing means and in which at least one of said sprocket shafts is rigid with the sprocket of said sprocket means and extends out of said chamber to provide an output shaft.

References Cited in the file of this patent
UNITED STATES PATENTS

| | | |
|---|---|---|
| 1,756,910 | Fuller | Apr. 29, 1930 |
| 2,532,254 | Bouchard | Nov. 28, 1950 |
| 2,567,505 | Bridenbaugh | Sept. 11, 1951 |

FOREIGN PATENTS

| | | |
|---|---|---|
| 484 | Great Britain | Feb. 5, 1877 |
| 27,232 | Great Britain | Nov. 25, 1909 |
| 952,308 | Germany | Nov. 15, 1956 |

OTHER REFERENCES
German printed application 20,765, Ia/60, July 5, 1956.